United States Patent
Wang et al.

(10) Patent No.: US 9,426,223 B2
(45) Date of Patent: *Aug. 23, 2016

(54) DUAL PEER-TO-PEER CONNECTION SYSTEM, DUAL PEER-TO-PEER CONNECTION METHOD AND COMPUTER APPLICATION PROGRAM THEREOF

(71) Applicant: JSW Pacific Corporation, New Taipei (TW)

(72) Inventors: Hsien-Hsiu Wang, New Taipei (TW); Yin-Chung Chen, New Taipei (TW)

(73) Assignee: JSW PACIFIC CORPORATION, New Taipci (TW)

( * ) Notice: Subject to any disclaimer, the term of this patent is extended or adjusted under 35 U.S.C. 154(b) by 158 days.

This patent is subject to a terminal disclaimer.

(21) Appl. No.: 14/560,069

(22) Filed: Dec. 4, 2014

(65) Prior Publication Data

US 2015/0237123 A1    Aug. 20, 2015

(30) Foreign Application Priority Data

Feb. 14, 2014  (TW) .............................. 103105014 A (51) Int. Cl.
*H04L 29/08* (2006.01)
*H04L 29/12* (2006.01)

(52) U.S. Cl.
CPC ........... *H04L 67/125* (2013.01); *H04L 61/2007* (2013.01)

(58) Field of Classification Search
None
See application file for complete search history.

(56) References Cited

U.S. PATENT DOCUMENTS

| | | | | |
|---|---|---|---|---|
| 8,848,608 B1 * | 9/2014 | Addepalli | ............. | H04W 4/046 370/328 |
| 2006/0126611 A1 * | 6/2006 | Kelly | ................ | H04L 29/12283 370/389 |
| 2007/0286369 A1 * | 12/2007 | Gutt | ...................... | H04L 67/125 379/127.01 |
| 2011/0282945 A1 * | 11/2011 | Thyni | ................. | H04L 41/0893 709/204 |
| 2011/0289228 A1 * | 11/2011 | Chen | ....................... | H04L 67/02 709/228 |
| 2012/0096138 A1 * | 4/2012 | Lambert | ........... | H04L 29/12254 709/223 |
| 2012/0096184 A1 * | 4/2012 | Lambert | ........... | H04L 29/12254 709/245 |
| 2012/0102106 A1 * | 4/2012 | Chen | .................... | H04W 76/023 709/204 |
| 2012/0108237 A1 * | 5/2012 | Schatzmayr | ...... | H04L 29/12188 455/435.1 |
| 2012/0179829 A1 * | 7/2012 | George | ............... | H04L 61/2564 709/227 |
| 2012/0215874 A1 * | 8/2012 | Sequeira | ................. | H04L 12/12 709/208 |
| 2013/0081121 A1 * | 3/2013 | Green | ................... | H04L 9/0827 726/7 |

(Continued)

Primary Examiner — Greg C Bengzon
(74) Attorney, Agent, or Firm — Chun-Ming Shih; HDLS IPR Services (57) ABSTRACT

A dual peer-to-peer connection system for obtaining a registration information of a remote network device from internet. The dual peer-to-peer connection system of this application comprises a subsystem and a user electronic device. The subsystem operatively connected to a router comprises a remote network device and a subsystem server. The user electronic device establishes a connection with the subsystem server according to a registration information of the subsystem server. The user electronic device obtains the registration information of the remote network device. The user electronic device establishes a connection with the remote network device according to the register information of the remote network device. This application can prevent from failing to obtain the registration information of the remote network device because of a peer-to-peer server being not connectible via configuring the subsystem server and the remote network device to the same router.

10 Claims, 6 Drawing Sheets

(56) References Cited

U.S. PATENT DOCUMENTS

| | | | |
|---|---|---|---|
| 2013/0094444 A1* | 4/2013 | Lai | H04W 8/265 370/328 |
| 2013/0104215 A1* | 4/2013 | Cheng | H04L 63/0876 726/7 |
| 2013/0201316 A1* | 8/2013 | Binder | H04L 67/12 348/77 |
| 2013/0346553 A1* | 12/2013 | Shin | H04W 76/043 709/217 |
| 2014/0064279 A1* | 3/2014 | Carlson | H04L 45/021 370/392 |
| 2014/0068023 A1* | 3/2014 | Arickan | H04L 61/2015 709/220 |
| 2014/0126581 A1* | 5/2014 | Wang | H04W 4/001 370/431 |
| 2014/0195615 A1* | 7/2014 | Kuo | H04L 67/104 709/204 |
| 2015/0113172 A1* | 4/2015 | Johnson | H04L 67/34 709/245 |
| 2015/0127733 A1* | 5/2015 | Ding | H04W 4/08 709/204 |
| 2015/0131485 A1* | 5/2015 | Brandt | H04L 1/00 370/254 |
| 2015/0237008 A1* | 8/2015 | Ansari | H04L 63/02 726/1 |
| 2016/0087933 A1* | 3/2016 | Johnson | G06F 17/30861 709/245 |
| 2016/0164923 A1* | 6/2016 | Dawes | H04L 65/1033 709/227 |

* cited by examiner

DUAL PEER-TO-PEER CONNECTION SYSTEM, DUAL PEER-TO-PEER CONNECTION METHOD AND COMPUTER APPLICATION PROGRAM THEREOF

BACKGROUND OF THE INVENTION

1. Field of the Invention

The invention relates to a peer-to-peer connection system, a peer-to-peer connection method and a computer application program thereof, and in particularly to a dual peer-to-peer connection system, a dual peer-to-peer connection method and a computer application program thereof for obtaining a registration information of a remote network device from internet.

2. Description of Related Art

With the advance of the computer technology and the popularity of internet, operating or monitoring a remote network device had become possible. After the user obtains a static IP address of a remote network device, the user can use a user electronic device to connect to the remote network device corresponded to the static IP address by a peer-to-peer connection via internet for operating or monitoring the remote network device.

However, because the number of the static IP address is limited and the rental fee of the static IP address is expensive, most of the network devices use a dynamic IP address obtained by Point-to-Point Protocol over Ethernet (PPPoE) or Dynamic Host Configuration Protocol (DHCP) by a router to connect to internet. In case that the user has no information about the current dynamic IP address of the remote network device, the user can't connect to the remote network device by the peer-to-peer connection via internet for remote operating or monitoring.

Figure 1:
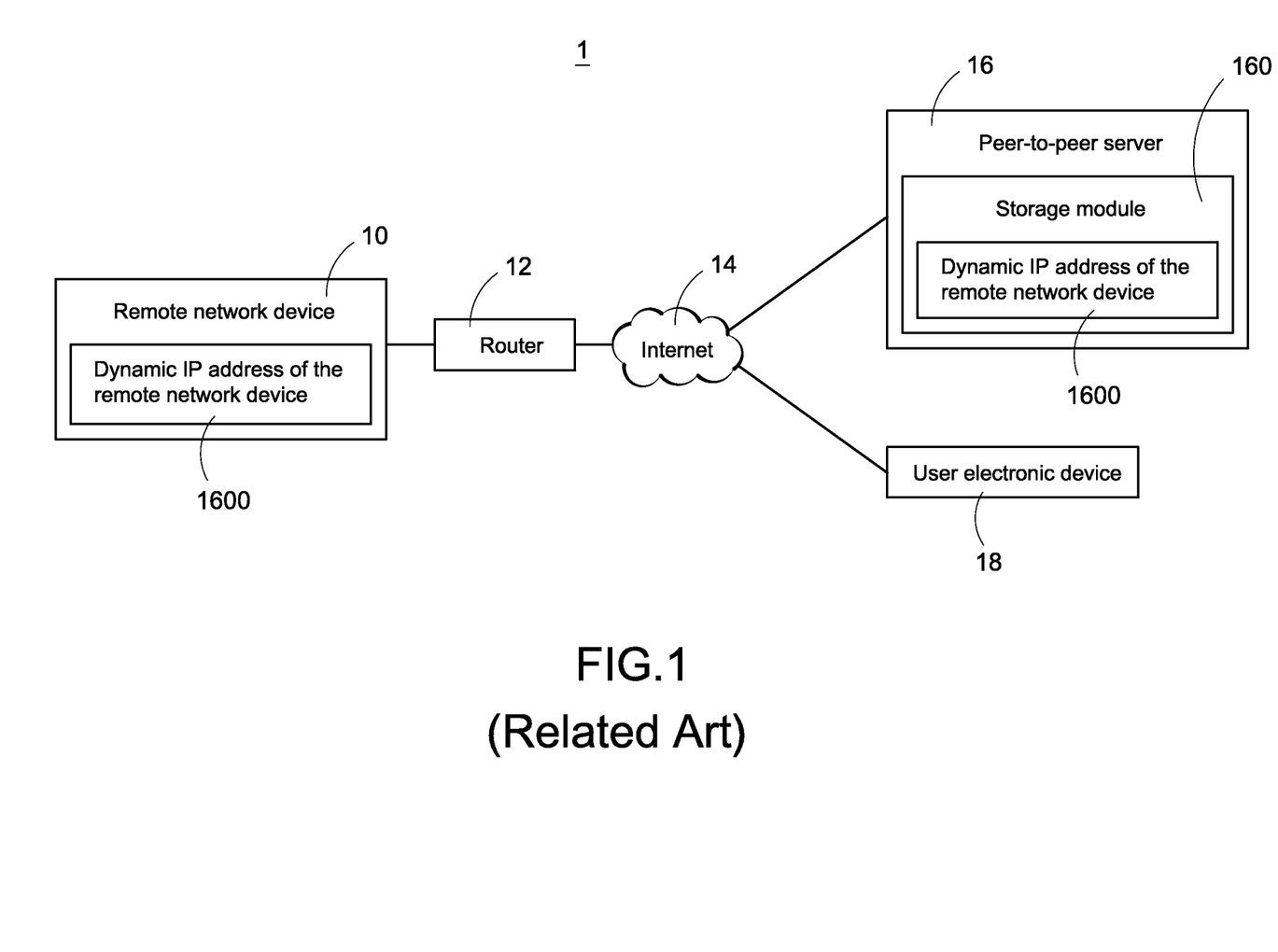
FIG. 1 is an architecture diagram of a conventional peer-to-peer connection system.

FIG. 1 is an architecture diagram of a related-art peer-to-peer connection system. The related-art peer-to-peer connection system 1 comprises a remote network device 10, a router 12, internet 14, a peer-to-peer server 16 and a user electronic device 18. The remote network device 10 periodically sends a current dynamic IP address 1600 of the remote network device 10 to the peer-to-peer server 16. The peer-to-peer server 16 receives and stores the dynamic IP address 1600 of the remote network device 10 to a storage module 160. When the user wants to connect to the remote network device 10, the user first uses the user electronic device 18 to connect to the peer-to-peer server 16 for obtaining the dynamic IP address 1600 of the remote network device 10. Then, the user uses the user electronic device 18 to connect to the remote network device 10 according to the dynamic IP address 1600 of the remote network device 10 by a peer-to-peer connection. The peer-to-peer connection system 1 can obtain the dynamic IP address 1600 of the remote network device 10 with above solution.

However, there is a serious defect in above configuration way, where the peer-to-peer server 16 and the remote network device 10 are configured in the different network environments. If the peer-to-peer server 16 is not connectible, the user can't use the user electronic device 18 to connect to the remote network device 10 for remote operation or monitoring (even the remote network device 10 is connectible), because the user can't obtain the dynamic IP address 1600 of the remote network device 10 from the peer-to-peer server 16.

SUMMARY OF THE INVENTION

The object of the present invention is providing a dual peer-to-peer connection system, dual peer-to-peer connection method and computer application program thereof for making a subsystem server and a remote network device be configured in the same network environment for obtaining a registration information of the remote network device via internet.

The present invention mainly provides a dual peer-to-peer connection system, comprising: a subsystem operatively connected to internet via a router, comprising: a remote network device comprising a peer-to-peer module for establishing a peer-to-peer connection; and a subsystem server comprising: a storage module storing a registration information of the remote network device; and a processor module operatively connected to the storage module, the processor module being used to establish a connection; a master system server operatively connected to internet, comprising: a storage module storing a registration information of the subsystem server; and a processor module operatively connected to the storage module, the processor module being used to establish a peer-to-peer connection; and a user electronic device operatively connected to internet; wherein the user electronic device establishes a connection with the master system server for obtaining the registration information of the subsystem server, the user electronic device establishes a connection with subsystem server for obtaining the registration information of the remote network device, the user electronic device establishes a peer-to-peer connection with the remote network device according to the registration information of the remote network device.

The present invention further provides a dual peer-to-peer connection method being used to a dual peer-to-peer connection system, the dual peer-to-peer connection system comprising a user electronic device and a subsystem, the user electronic device being operatively connected to internet, the subsystem operatively connected to internet via a router comprising a remote network device and a subsystem server, the dual peer-to-peer connection method comprising following steps of: a) the user electronic device accepting a request for operatively connecting to the remote network device; b) the user electronic device establishing a connection with the subsystem server according to the registration information of the subsystem server; c) the user electronic device obtaining a registration information of the remote network device from the subsystem server; and d) the user electronic device establishing a peer-to-peer connection with the remote network device according to the registration information of the remote network device.

The present invention further provides a computer application program comprising a computer executable source code, the steps according to above paragraph being executed when a computer executed the computer application program.

Comparing with prior art, the present invention can prevent from the user failing to obtain the registration information of the remote network device even the remote network device is connectible because of the peer-to-peer server being not connectible via making both the subsystem server and the remote network device being configured to connect to the same router.

DETAILED DESCRIPTION OF THE INVENTION

Figure 2:
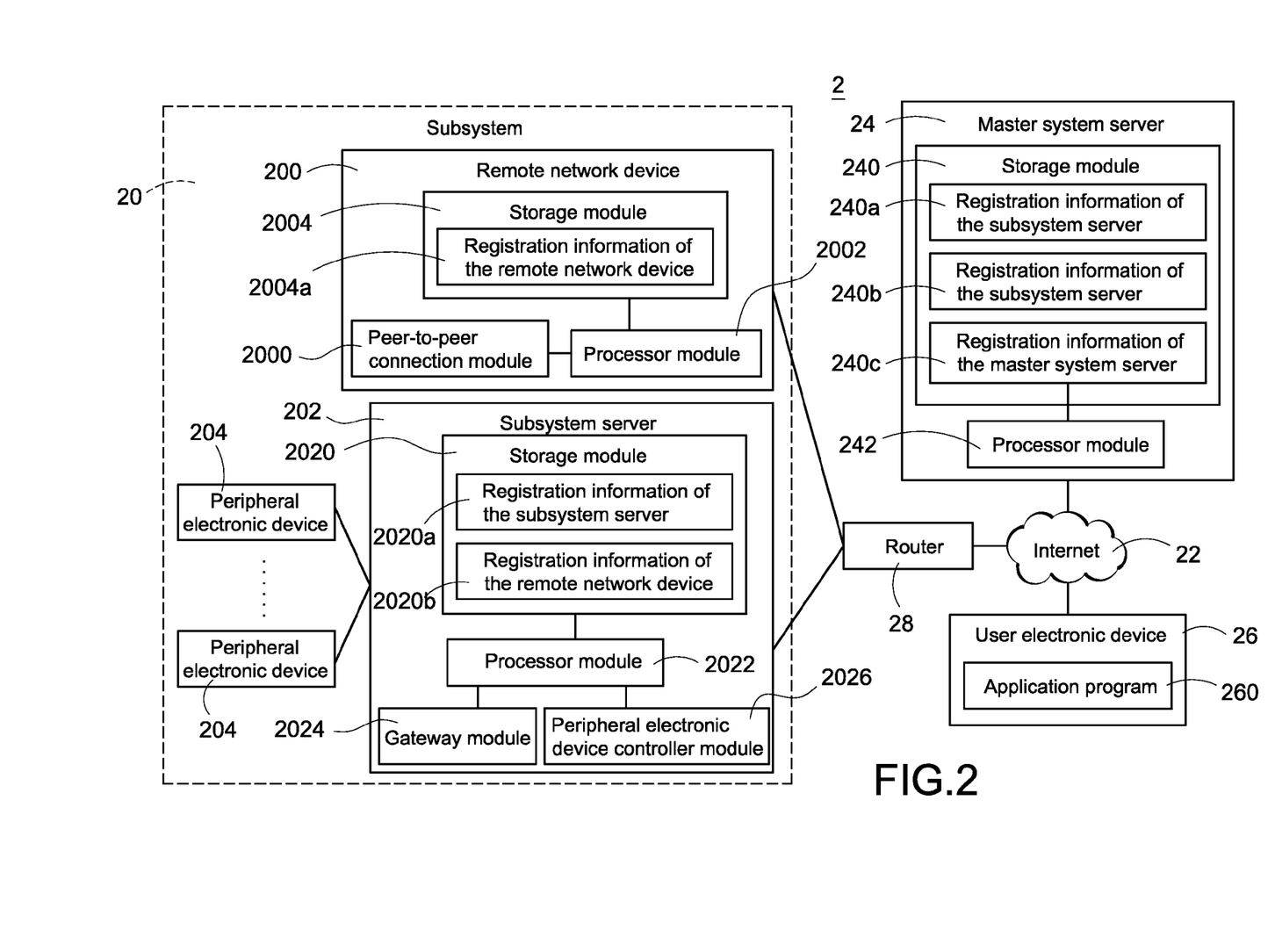
FIG. 2 is an architecture diagram of a dual peer-to-peer connection system of a first embodiment according to the present invention.

FIG. 2 is an architecture diagram of a dual peer-to-peer connection system of a first embodiment according to the present invention. As shown in FIG. 2, a dual peer-to-peer connection system 2 of this embodiment mainly comprises a subsystem 20, a master system server 24 and an application program 260.

The subsystem 20 is operatively connected to internet 22 via a router 28. The application program 260 is installed in a user electronic device 26. The user electronic device 26 is also operatively connected to internet 22.

In above description, the term "operative connection" means wired connection or wireless connection. In the following description, for brevity, "a device A is operatively connected to a device B" means that the device A is connected to the device B either through wired or wireless connection.

The subsystem 20 comprises a remote network device 200 and a subsystem server 202. Preferably, the devices of the subsystem 20 are configured to constitute a Local Area Network (LAN) by connecting to the same router 28.

The remote network device 200 and the subsystem server 202 are respectively corresponded to a registration information 2004a and a registration information 2020a. The external device can respectively connect to the remote network device 200 or the subsystem server 202 by the registration information 2004a or the registration information 2020a.

Preferably, the registration information 2004a and the registration information 2020a respectively comprises a dynamic IP address of the remote network device 200 and a dynamic IP address of the subsystem 202. The dynamic IP addresses are assigned by the router 28.

In this embodiment, the registration information 2004a and the registration information 2020a comprises the dynamic IP address, but not intended to limit the scope of the present invention.

In another embodiment of the present invention, the registration information 2004a and the registration information 2020a can further comprise a device identification number, a device type or a current device state of the remote network device 200 or the subsystem server 202 respectively.

The remote network device 200 comprises a peer-to-peer connection module for establishing a peer-to-peer connection with the user electronic device 26. Preferably, the remote network device 200 is a network camera and further comprises a storage module 2004 for storing the registration information 2004a of the remote network device 200.

In another embodiment of the present invention, the remote network device 200 further comprises a processor module 2002 connected to the storage module 2004 and the peer-to-peer connection module 2000. The processor module 2002 is used to periodically update the registration information 2004a of the remote network device 200 stored in the storage module 2004 and to periodically send the registration information 2004a of the remote network device 200 to the master system server 24.

After the master system server 24 receives the registration information 2004a of the remote network device 200, the master system server 24 updates the registration information 240b of the remote network device 200 stored in a storage module 240 of the master system server 24.

In this embodiment, the processor module 2002 is used to update and send the registration information 2004a of the remote network device 200 to the master system device 24, but not intended to limit the scope of the present invention.

In another embodiment of the present invention, the processor module 2002 updates and sends the registration information 2004a of the remote network device 200 to the master system device 24 when any data of the registration information 2004a is modified (such as the router 28 reassigns a different dynamic IP address to the remote network device 200).

The subsystem server 202 comprises a storage module 2020 and a processor module 2022. The storage module 2020 stores a registration information 2020b of the remote network device 200 and a registration information 2020a of the subsystem server 202. The processor module 2022 connected to the storage module 2020 is used to establish a connection with the electronic device 26.

In another embodiment of the present invention, the subsystem server 202 periodically obtains the registration information 2004a of the remote network device 200 via the router 28 and periodically updates the registration information 2020b of the remote network device 200 stored in the storage module 2020.

In another embodiment of the present invention, the processor module 2022 further periodically updates and sends the registration information 2020a of the subsystem server 202 to the master system server 24.

In this embodiment, the processor module 2022 is used to update and send the registration information 2020a of the subsystem server 202, but not intended to limit the scope of the present invention.

In another embodiment of the present invention, the processor module 2022 updates the registration information 2020a of the subsystem server 202 when any data of the registration information 2020a is modified, such as the router 28 reassigns a different dynamic IP address to the subsystem server 202.

The master system server 24 comprises a storage module 240 and a processor module 242. The storage module 240 stores a registration information 240a of the subsystem server 202 and a registration information 240c of the master system server 24. The processor module 242 connects to the storage module 240 to establish a connection with the user electronic device 26.

Preferably, the registration information 240c of the master system server 24 comprises a static IP address.

In another embodiment of the present invention, the storage module 240 further stores a registration information 240b of the remote network device 200.

The application program 260 is installed in the user electronic device 26. The user electronic device 26 can accept a request for connecting to the remote network device 200.

Preferably, the user electronic device 26 can execute the application program 260 for providing and displaying a Graphical User Interface (GUI) (not shown).

The user can operate the GUI to input the request. The user electronic device 26 establishes a connection with the master system server 24 according to the registration information 240c of the master system server 24, and obtains the registration information 240a of the subsystem server 202.

Preferably, the registration information 240c of the master system server 24 is pre-stored in the user electronic device 26. The user electronic device 26 establishes a connection with the subsystem 202 according to the registration information 240a of the subsystem server 202, and obtains the registration information 2020b of the remote network device 200.

Preferably, the user electronic device 26 establishes a peer-to-peer connection with the subsystem 202. The user electronic device 26 establishes a peer-to-peer connection with the remote network device 200 according to the registration information 2020a of the remote network device 200 for remote operating or monitoring.

In another embodiment of the present invention, the application program 260 of the user electronic device 26 can further determine whether the master system server 24 is connectible. If the application program 260 determines the master system server 24 is not connectible, the application program 260 establishes a peer-to-peer connection with the subsystem server 202 (described later) to obtain the registration information 2020b of the remote network device 200. If the application program 260 determines the master system server 24 is connectible, the application program 260 establishes a connection with the master system server 24, and obtains the registration information 240a of the remote network device 200 from the master system server 24.

In another embodiment of the present invention, the subsystem 20 further comprises at least one peripheral electronic device 204. The peripheral electronic device 204 connects to the subsystem server 202 by wired connection or wireless connection. The subsystem server 202 further comprises a gateway module 2024 and a peripheral electronic device controller module 2026.

The gateway module 2024 connected to the processor module 2022 is used to make the peripheral electronic device 204 connect to the router 28. The peripheral electronic device controller module 2026 connected to the processor module 2022 is used to monitor the peripheral electronic device 204. Preferably, the peripheral electronic device 204 is a network camera, a digital video recorder (DVR), a camera having object detection function or a sensor having object detection function. After the user electronic device 26 establishes a connection with the subsystem server 202, the user electronic device 26 can monitor the peripheral electronic device 204 via the peripheral electronic device controller module 2026. The peripheral electronic device 204 can also send a message to the user electronic device 26 via the gateway module 2024.

Figure 3:
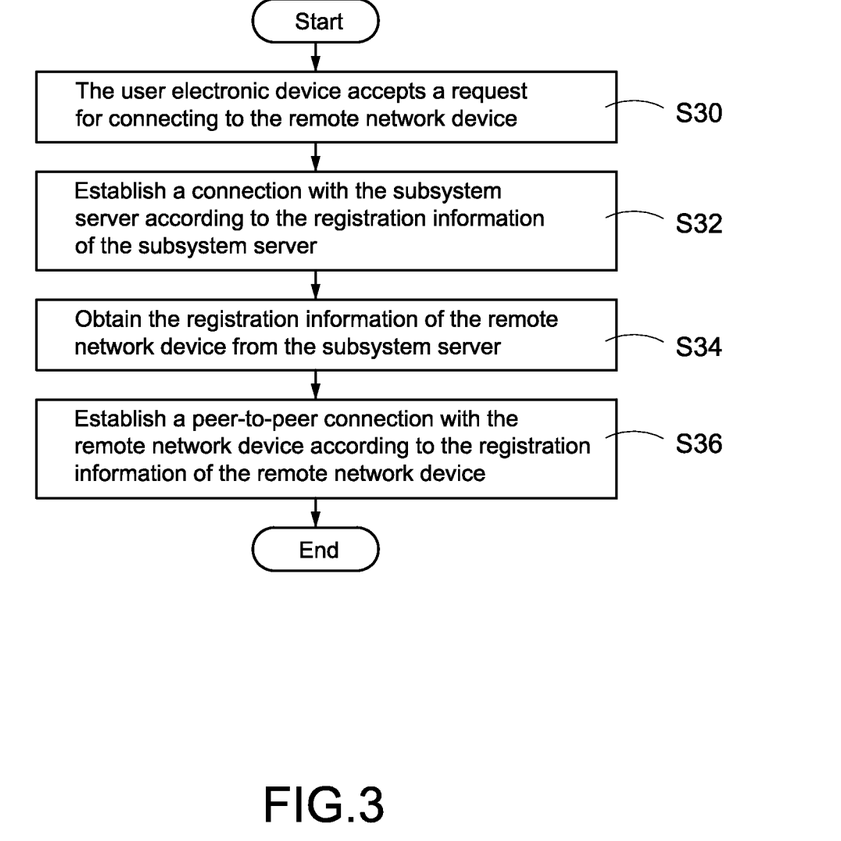
FIG. 3 is an architecture diagram of a dual peer-to-peer connection system of a second embodiment according to the present invention.

FIG. 3 is an architecture diagram of a dual peer-to-peer connection system of a second embodiment according to the present invention. The dual peer-to-peer connection method of this embodiment is mainly implemented with the dual peer-to-peer connection system 2 shown in FIG. 2. The user electronic device 26 executes the application program 260 to execute following steps.

As shown in FIG. 3, in step S30, the user electronic device 26 executes the application program 260 to accept a request for connecting to the remote network device 200. Preferably, the user electronic device 26 accepts the request inputted by the user via the GUI.

In step S32, the user electronic device 26 establishes a connection with the subsystem server 202 according to the registration information 2020b of the subsystem server 202. Preferably, the user electronic device 26 first connects to the master system server 24 and obtains the registration information 240a of the subsystem server 202 corresponded to the registration information 2020a of the subsystem server 202 via internet 22. The user electronic device 26 establishes the connection with the subsystem server 202 according to a dynamic IP address comprised in the registration information 240a of the subsystem server 202.

In step S34, the user electronic device 26 obtains the registration information 2020b of the remote network device 200 from the subsystem server 202. After the user electronic device 26 establishes the connection with the processor module 2022 of the subsystem server 202, the processor module 2022 of the subsystem server 202 sends the registration information 2020b of the remote network device 200 stored in the storage module 2020 to the user electronic device 26.

In step S36, the user electronic device 26 establishes a peer-to-peer connection with the remote network device 200 according to the registration information 2020b of the remote network device 200. Preferably, the user electronic device 26 establishes the peer-to-peer connection with the remote network device 200 for remote operating and monitoring according to a dynamic IP address of the registration information 2020b of the remote network device 200 obtained in step S34.

Figure 4A:
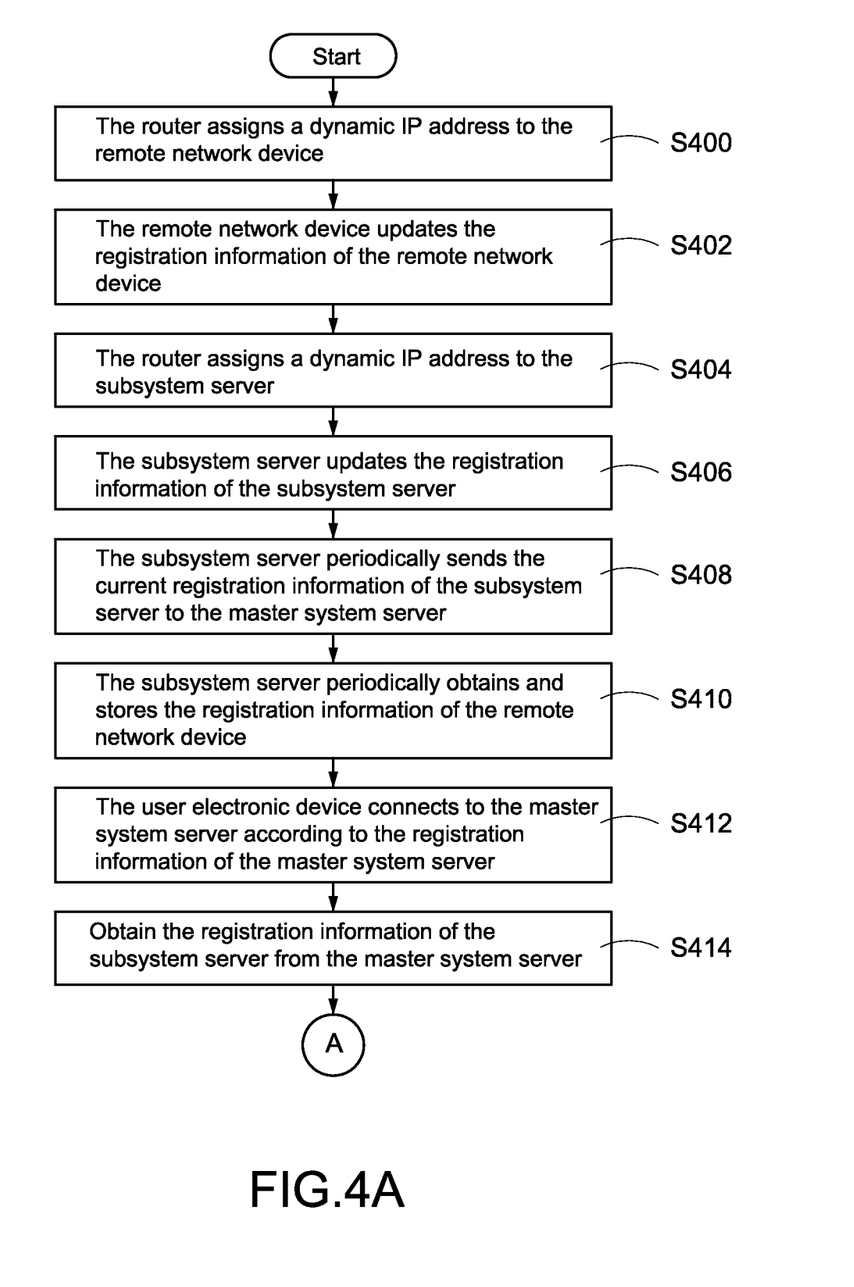
FIG. 4A is a first flowchart of a dual peer-to-peer connection method of a third embodiment according to the present invention.
Figure 4B:
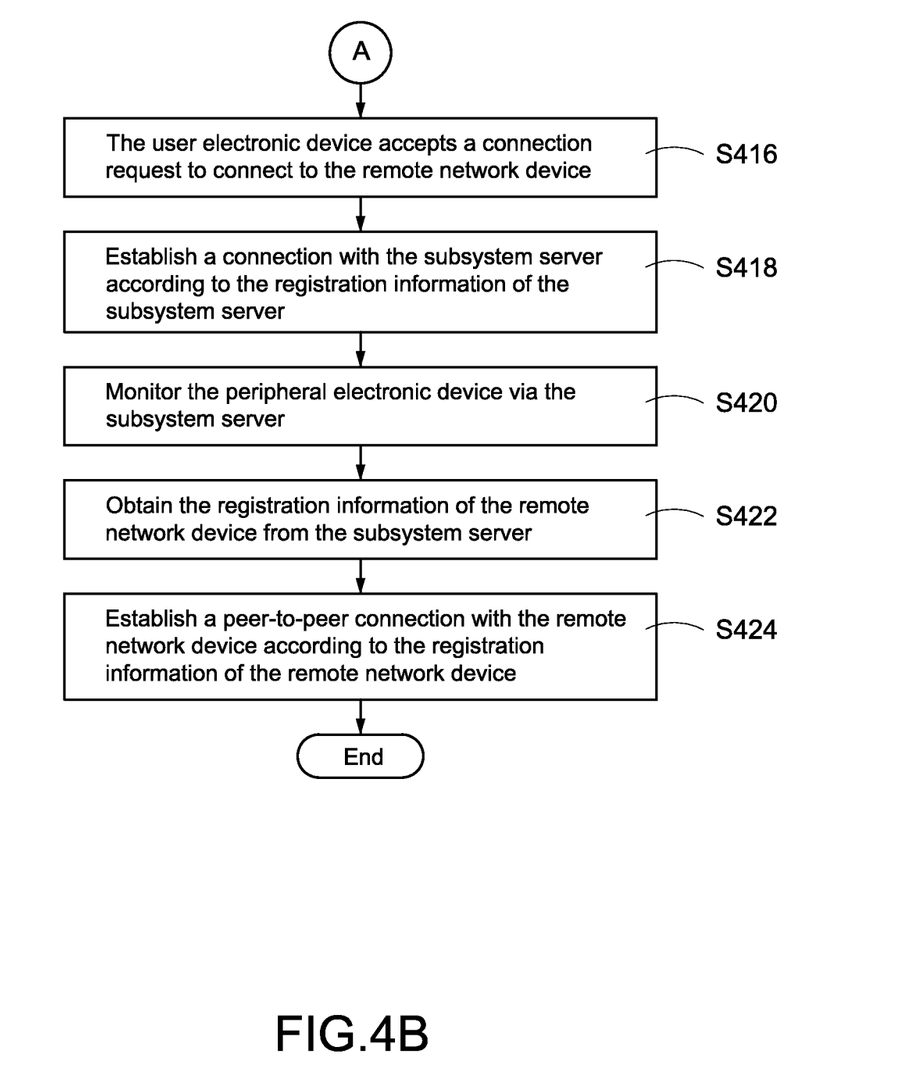
FIG. 4B is a second flowchart of a dual peer-to-peer connection method of a third embodiment according to the present invention.

FIG. 4A is a first flowchart of a dual peer-to-peer connection method of a third embodiment according to the present invention. FIG. 4B is a second flowchart of a dual peer-to-peer connection method of a third embodiment according to the present invention. The dual peer-to-peer connection method of this embodiment is mainly implemented with the dual peer-to-peer connection system 2 shown in FIG. 2.

As shown in FIG. 4A and FIG. 4B, in step S400, the router 28 assigns a dynamic IP address to the remote network device 200. After the remote network device 200 connects to the router 28 by wired connection or wireless connection, the remote network device 200 sends a request of assigning an IP address to the router 28. The router 28 assigns a dynamic IP address to the remote network device 200 for responding the request. Thus, the remote network device 200 can connect to internet 22 by using the assigned dynamic IP address.

In step S402, the remote network device 200 updates the registration information 2004a of the remote network device 200. The remote network device 200 updates the registration information 2004a of the remote network device 200 stored in the storage module 2004 according to the current assigned dynamic IP address.

In step S404, the router 28 assigns a dynamic IP address to the subsystem server 202. After the subsystem server 202 connects to the router 28 by wired connection or wireless connection, the subsystem server 202 sends a request of assigning an IP address. The router 28 assigns the dynamic IP address to the subsystem server 202 for responding the request. Thus, the subsystem server 202 can connect to internet 22 by using the assigned dynamic IP address.

In step S406, the subsystem server 202 updates the registration information 2020a of the subsystem server 202. The subsystem server 202 updates the registration information 2020a of the subsystem server 202 stored in the storage module 2020 according to the current assigned dynamic IP address.

In step S408, the subsystem server 202 periodically sends the current registration information 2020a of the subsystem server 24 to the master system server 24. After the master system server 24 receives the registration information 2020a of the subsystem server 202 from the subsystem server 202, the master system server 24 updates the registration information 204a of the subsystem server 202 stored in the storage module 240 according to the registration information 2020a of the subsystem server 202.

In this embodiment, the subsystem server 202 periodically sends the current registration information 2020a of the subsystem server 24 to the master system server 24, but not intended to limit the scope of the present invention.

In another embodiment, the subsystem server 202 updates the registration information 2020a of the subsystem server 202 when any data of the registration information 2020a is modified. For example, when the router 28 reassigns a different dynamic IP address to the subsystem server 202, the subsystem server 202 sends the registration information 2020a to the master system server 24.

In step S410, the subsystem server 202 periodically obtains and stores the registration information 2020b of the remote network device 200. Particularly, the subsystem server 202 periodically obtains and stores the registration information 2004a of the remote network device 200 to the storage module 2020 for updating the registration information 2020b via the router 28.

In step S412, the user electronic device 26 connects to the master system server 24 according to the registration information 240c of the master system server 24. Preferably, the registration information 240c of the master system server 24 is pre-stored in the user electronic device 26, and the registration information 240c of the master system server 24 comprises a static network address of the master system server 24.

In step S414, the user electronic device 26 obtains the registration information 240a of the subsystem server 202 from the master system server 24. After the user electronic device 26 establishes a connection with the processor module 242 of the master system server 240, the processor module 242 sends the registration information 240a of the subsystem server 202 stored in the storage module 240 to the user electronic device 26.

Preferably, above registration information 240a is same as the current registration information 2020a sent to the master system server 24 by the subsystem server 202 described in step S408.

In step S416, the user electronic device 26 accepts a connection request to connect to the remote network device 200.

In this embodiment, step S416 is executed after step S300-S414 are executed, but not intended to limit the scope of the present invention. There isn't order relationship between steps S400-S414 and step S416. In another embodiment, step S416 is executed before steps S400-S414.

In step S418, the user electronic device 26 establishes a connection with the subsystem server 202 according to the registration information 240a of the subsystem server 202. Preferably, the registration information 240a of the subsystem server 202 is obtained by the application program 260 from the master system server 24 in step S414. Then, the user electronic device 26 executes step S422.

In step S422, the user electronic device 26 obtains the registration information 2020b of the remote network device 200 from the subsystem server 202.

In step S424, the user electronic device 26 establishes a peer-to-peer connection with the remote network device 200 according to the registration information 2020b of the remote network device 200. The registration information 2020b of the remote network device 200 is obtained by the user electronic device 26 from the storage module 2020 of the subsystem server 202 in step S422.

In another embodiment of the present invention, the subsystem server 202 is a gateway to connect at least one peripheral electronic device 204 to the router 28. Step S420 is executed following step S418. In step S420, the user electronic device 26 monitors the peripheral electronic device 204 via the subsystem server 202. After the user electronic device 26 establishes the peer-to-peer connection with the subsystem server 202, the user electronic device 26 can monitor or control the peripheral electronic device 204 via the peripheral electronic device controller module 2026 of the subsystem server 202. The peripheral electronic device 204 can also send a message to the user electronic device 26 via the gateway module 2024.

It should be noticed that step S420 is executed before steps S422-S424 as shown in FIG. 4A and FIG. 4B, but not intended to limit the scope of the present invention. There isn't order relationship between steps S422-S424 and step S420. In another embodiment, only steps S422-S424 are executed, step S420 is not executed. In another embodiment, step S420 is executed following steps S422-S424.

Figure 5:
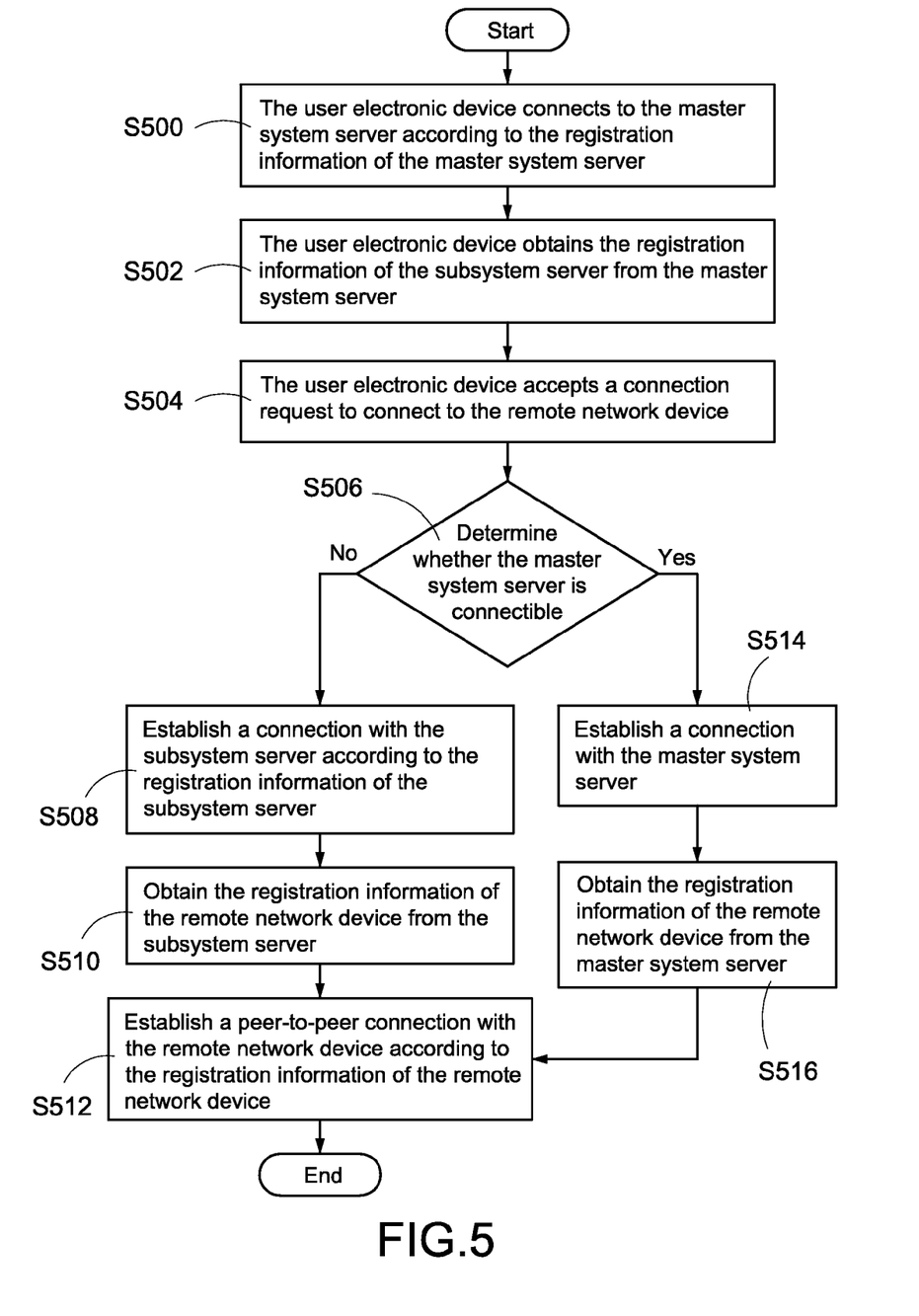
FIG. 5 is a flowchart of a dual peer-to-peer connection method of a fourth embodiment according to the present invention.

FIG. 5 is a flowchart of a dual peer-to-peer connection method of a fourth embodiment according to the present invention. The dual peer-to-peer connection method of this embodiment is mainly implemented with the dual peer-to-peer connection system 2 shown in FIG. 2.

In step S500, the user electronic device 26 connects to the master system server 24 according to the registration information 240c of the master system server 24. Preferably, the registration information 240c of the master system server 24 is pre-stored in the user electronic device 26. The registration information 240c of the master system server 24 comprises the static network address of the master system server 24.

In step S502, the user electronic device 26 obtains the registration information 240a of the subsystem server 202 from the master system server 24. After the user electronic device 26 establishes a connection with the master system server 24, the master system server 24 sends the registration information 240a of the subsystem server 202 stored in the storage module 240 to the user electronic device 26. In another embodiment of the present invention, the user electronic device 26 can simultaneously obtain the registration information 240a of the subsystem server 202 and the registration information 240b of the remote network device 200 from the master system server 24.

In step S504, the user electronic device 26 accepts a connection request to connect to the remote network device 200.

In step S506, the user electronic device 26 determines whether the master system server 24 is connectible. Particularly, the user electronic device 26 sends a connection require to the master system server 24, and waits for receiving a responding message from the master system server 24. If a threshold time elapses and the user electronic device 26 never receives the responding message from the master system server 24, the user electronic device 26 determines the master system server is not connectible. The user electronic device 26 executes steps S508-S510.

In step S508, the user electronic device 26 establishes a connection with the subsystem server 202 according to the registration information 240a of the subsystem server 202. Preferably, the registration information 240a of the subsystem server 202 is obtained from the master system server 24 in last time that the user electronic device 26 successfully established the connection with the master system server 24 (means step S502).

In step S510, the user electronic device 26 obtains the registration information 2020b of the remote network 200 device from the subsystem server 202. And the user electronic device 26 executes step S512 to establish a peer-to-peer connection with the remote network device 200.

If the user electronic device 26 receives the responding message from the master system server 24 before the threshold time passed in step S506, the user electronic device 26 determines the master system server 24 is connectible. The user electronic device 26 executes steps S514-S516.

In step S514, the user electronic device 26 establishes a connection with the master system server 24.

In step S516, the user electronic device 26 obtains the registration information 240b of the remote network device 200 from the master system server 24. In another embodiment of the present invention, the user electronic device 26 further obtains the newest registration information 240a of the subsystem server 202 from the master system server 24. The user electronic device 26 executes step S512.

In step S512, the user electronic device 26 establishes a peer-to-peer connection with the remote network device 200 according to the registration information 240b of the remote network device 200. Particularly, the user electronic device 26 establishes the peer-to-peer connection with the remote network device 200 according to the registration information 240b of the remote network device 200 obtained in step S510 or step S516 for remote monitoring or operating the remote network device 200.

This application can make both the subsystem server 202 and the remote network device 200 have the same network state by configuring both the subsystem server 202 and the remote network device 200 to connect to the same router 28 (In other words, the subsystem server 202 and the remote network device 200 are configured in the same LAN). Because the subsystem server 202 and the remote network device 200 connects to internet via the same router 28, the subsystem server 202 and the remote network device 200 are simultaneously connectible or not connectible. Therefore, the present invention can prevent from the user failing to obtain the registration information of the remote network device even the remote network device is connectible because of the peer-to-peer server being not connectible as the prior art.

This application can provide a redundancy service of providing the registration information of the remote network device 200 via executing the application program 260 to determine whether the master system server 24 is connectible and obtaining the registration information of the remote network device 200 from the subsystem server 202 or the master system server 24 according to the determination result of the master system server 24. In other words, when the master system server 24 is not connectible, the subsystem server 202 will be a backup server of the master system server 24 and continuously provide the service of providing the registration information of the remote network device 200.

The present invention can not only effectively save the cost of configuring the hardware and reduce the volume of the hardware, but also simultaneously provide the service of monitoring the peripheral electronic device, the service of gateway and the service of providing the registration information via configuring the subsystem server 202 to provide the service of providing the registration information, the service of monitoring the peripheral electronic device and a service of gateway.

As the skilled person will appreciate, various changes and modifications can be made to the described embodiment. It is intended to include all such variations, modifications and equivalents which fall within the scope of the present invention, as defined in the accompanying claims.

What is claimed is:

1. A dual peer-to-peer connection system, comprising:
a subsystem operatively connected to internet via a router, the subsystem comprising:
a remote network device comprising a peer-to-peer module for establishing a peer-to-peer connection; and
a subsystem server comprising:
a storage module storing a registration information of the remote network device; and
a processor module connected to the storage module, the processor module being used to establish a connection,
wherein the subsystem server and the remote network device are configured to connect to the same router;
a master system server operatively connected to internet, comprising:
a storage module storing a registration information of the subsystem server; and
a processor module connected to the storage module, the processor module being used to establish a peer-to-peer connection; and
a user electronic device operatively connected to internet;
wherein the user electronic device establishes a connection with the master system server for obtaining the registration information of the subsystem server, the user electronic device establishes a connection with the subsystem server for obtaining the registration information of the remote network device, the user electronic device establishes a peer-to-peer connection with the remote network device according to the registration information of the remote network device;
wherein the registration information of the remote network device comprises a current dynamic IP address of the remote network device; the registration information of the subsystem server comprises a current dynamic IP address of the subsystem server;
wherein the current dynamic IP address of the remote network device and the current dynamic IP address of the subsystem server are assigned by the router; the registration information of the remote network device further comprises a device identification number of the remote network device; the registration information of the subsystem server further comprises a device identification number of the subsystem server.

2. The dual peer-to-peer connection system according to claim 1, wherein the remote network device is a network camera.

3. The dual peer-to-peer connection system according to claim 1, wherein the subsystem further comprises at least one peripheral electronic device operatively connected to the subsystem server; the subsystem server further comprises:
a gateway module connected to the processor module being used to make the peripheral electronic device operatively connect to the router; and
a peripheral electronic device controller module connected to the processor module to monitor the peripheral electronic device.

4. The dual peer-to-peer connection system according to claim 3, wherein the user electronic device monitors the peripheral electronic device via the peripheral electronic device controller module after the user electronic device establishes the connection with the subsystem server.

5. The dual peer-to-peer connection system according to claim 1, wherein the remote network device further comprises a processor module to periodically update and send the registration information of the remote network device to the master system serve; the subsystem server periodically obtains and stores the registration information of the remote network device; the subsystem server periodically update and send the registration information of the subsystem server to the master system serve.

6. A dual peer-to-peer connection method being used to a dual peer-to-peer connection system, the dual peer-to-peer connection system comprising a user electronic device and a subsystem, the user electronic device being operatively connected to internet, the subsystem operatively connected to internet via a router comprising a remote network device and a subsystem server, wherein the subsystem server and the remote network device are configured to connect to the same router, the dual peer-to-peer connection method comprising following steps of:
- a) the user electronic device accepting a request for operatively connecting to the remote network device;
- b) the user electronic device establishing a connection with the subsystem server according to the registration information of the subsystem server;
- c) the user electronic device obtaining a registration information of the remote network device from the subsystem server; and
- d) the user electronic device establishing a peer-to-peer connection with the remote network device according to the registration information of the remote network device;

wherein the dual peer-to-peer connection system further comprises a master system server operatively connected to internet, the dual peer-to-peer connection method further comprises following steps before the step b:
- b1) the user electronic device operatively connecting to the master system server according to the registration information of the master system server;
- b2) the user electronic device obtaining the registration information of the subsystem server from the master system server;
- b3) the router assigning a dynamic IP address to the remote network device;
- b4) the remote network device updating the registration information of the remote network device;
- b5) the router assigns a dynamic IP address to the subsystem server; and
- b6) the subsystem server updating the registration information of the subsystem server.

7. The dual peer-to-peer connection method according to claim 6, wherein the dual peer-to-peer connection method further comprises following steps before the step b1:
- B7) periodically sending the current registration information of the subsystem server to the master system server; and
- B8) periodically obtaining and storing the registration information of the remote network device.

8. The dual peer-to-peer connection method according to claim 6, wherein the registration information of the remote network device comprises a current dynamic IP address of the remote network device; the registration information of the subsystem server comprises a current dynamic IP address of the subsystem server.

9. The dual peer-to-peer connection method according to claim 6, wherein the subsystem server is a gateway to operatively connect a peripheral electronic device to the router; before the step b, the dual peer-to-peer connection method further comprises step b9 monitoring the peripheral electronic device via the subsystem server.

10. The dual peer-to-peer connection method according to claim 6, wherein the dual peer-to-peer connection system further comprises a master system server; the dual peer-to-peer connection method further comprises following steps before the step a:
- a1) the user electronic device operatively connecting to the master system server according to the registration information of the master system server; and
- a2) the user electronic device obtaining the registration information of the subsystem server from the master system server;
- a3) the user electronic device determining whether the master system server being connectible;
- a4) executing the step b if the master system server being not connectible.

* * * * *